United States Patent

Haartsen

[11] Patent Number: 5,940,765
[45] Date of Patent: Aug. 17, 1999

[54] RADIO COMMUNICATIONS SYSTEMS AND METHODS FOR JITTERED BEACON TRANSMISSION

[75] Inventor: Jacobus Cornelis Haartsen, Staffanstorp, Sweden

[73] Assignee: Telefonaktiebolaget LM Ericsson, Sweden

[21] Appl. No.: 08/708,039

[22] Filed: Aug. 30, 1996

[51] Int. Cl.[6] ................................................ H04B 7/005
[52] U.S. Cl. .................. 455/462; 455/502; 455/515; 455/63
[58] Field of Search .................... 455/63, 462, 422, 455/426, 434, 435, 502, 515, 517, 521, 575, 179.1, 181.1, 59; 370/503, 516, 445, 800, 337, 350, 442

[56] References Cited

U.S. PATENT DOCUMENTS

| | | | |
|---|---|---|---|
| 4,703,324 | 10/1987 | White | 455/465 |
| 5,109,528 | 4/1992 | Uddenfeldt . | |
| 5,218,628 | 6/1993 | Ito | 455/462 |
| 5,239,306 | 8/1993 | Siwiak et al. . | |
| 5,428,668 | 6/1995 | Dent et al. . | |
| 5,448,764 | 9/1995 | Sondermann et al. | 455/462 |
| 5,483,537 | 1/1996 | DUpuy | 370/337 |
| 5,495,520 | 2/1996 | Kojima | 455/462 |
| 5,754,626 | 5/1998 | Otonari | 455/63 |

FOREIGN PATENT DOCUMENTS

| | | |
|---|---|---|
| 0 674 454 A2 | 9/1995 | European Pat. Off. . |
| 2 264 842 | 9/1993 | United Kingdom . |
| 2 269 723 | 2/1994 | United Kingdom . |

WO 94/00946   1/1994   WIPO .

OTHER PUBLICATIONS

Mouly et al., *THe GSM System for Mobile Communications*, Jan. 1993 pp. 425–429.

Primary Examiner—Reinhard J. Eisenzopf
Assistant Examiner—Lester G. Kincaid
Attorney, Agent, or Firm—Myers Bigel Sibley & Sajovec

[57] ABSTRACT

Radio beacon transmission between a private radio communications base station and a mobile terminal within the transmission range of the private radio communications base station designed to prevent interference with overlapping uncoordinated private radio communications networks is provided by jittered beacon transmission. The private base station transmits radio beacon bursts at jittered time intervals, which vary pseudo-randomly to prevent repeated radio beacon collisions between uncoordinated private radio communications networks with overlapping transmission ranges. The beacon time jittering is performed pseudo-randomly in a pattern which is associated with a base station identification value. The mobile terminal derives the base station associated identification value and status information from a received radio beacon and determines if the base station is available for communications with the mobile terminal. The mobile terminal further synchronizes with the jittered base station beacon transmissions based on the pre-determined jitter generation function associated with the base station identification value derived from the received radio beacon. The mobile terminal is thereby able to readily maintain synchronization with one or more private radio communications network base stations without losing synchronization due to repeated radio beacon burst collisions between the base stations.

14 Claims, 7 Drawing Sheets

RADIO COMMUNICATIONS SYSTEMS AND METHODS FOR JITTERED BEACON TRANSMISSION

FIELD OF THE INVENTION

This invention relates to radio communication systems and more particularly to uncoordinated private radio communications systems.

BACKGROUND OF THE INVENTION

In the past decades, the commercial application of cellular radio communications for cordless and mobile telephony has seen an enormous rise. Typically, these wide area cellular networks can be divided into two parts: a fixed part including an interconnected network of radio base stations, and a mobile or portable part including the mobile terminals that can access the network, for example, radio telephones. Each base station transmits control information on a control channel which can be used by the mobile terminals to access the network. Each radio base station in the network covers a restricted area, called the cell. The different base stations in the network are coordinated by way of the base station controllers (BSC). A frequency reuse pattern (fixed or adaptive) is applied to avoid interference in the transmissions from different base stations. Examples of these cellular systems include AMPS, D-AMPS, and GSM.

In private macrocell systems, the network part differs from the wide area cellular network equivalent. The private systems in general have to be much cheaper (since the system cost is shared among fewer users). In addition, the private systems typically cover an indoor environment which is less predictable than the outdoor environment (for example: walls, doors that open and close, corridors that act as wave guides). Therefore, in general, the radio base stations in indoor systems operate in a more autonomous way, determining themselves which channels to use for traffic and control (or beacon) information.

In business or office cordless phone systems like, for example, DECT, there can still be a certain degree of interaction between the base stations of a single indoor network. While the radio base stations in a business system like DECT are as autonomous as possible, they are loosely time synchronized through the network in order to allow for handovers from one base station to the other. Network functions are performed in a base station controller. For handover purposes, it is important that the beacons from different base stations arrive at the mobile terminal in a restricted time window to be scanned during idle frames of communications. In private residential systems such as, for example, a cordless phone, the radio base station of the cordless phone forms a single, private network which is only connected to the PSTN, and there are typically no communications or synchronization with other private, residential base stations (like those from the neighbors). In indoor radio systems, radio base stations themselves find the channels to operate on. These channels should preferably not interfere with other, nearby radio base stations. Therefore, a radio base station finds the channels with the lowest amount of interference (quietest channels) before it starts transmitting. Periodic measurements may be performed to assure that the base station remains on the least interfered channels.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones (mobile terminals) communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 MHZ. At present there are 832, 30-Khz wide, radio channels allocated to cellular mobile communications in the United States.

The limitations on the number of available frequency bands presents several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

Another technique which may further increase channel capacity and spectral efficiency is time division multiple access (TDMA). A TDMA system may be implemented by subdividing the frequency bands employed in conventional FDMA systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots. In these TDMA systems, each user communicates with the base station using bursts of digital data transmitted during the user's assigned time slots.

A channel in a TDMA system typically includes one or more time slots on one or more frequency bands. As discussed above, traffic channels are used to communicate voice, data or other information between users, for example, between a radiotelephone and a landline telephone. In this manner, each traffic channel forms one direction of the duplex communications link established by the system from one user to another. Traffic channels typically are dynamically assigned by the system when and where needed. In addition, systems such as the European GSM system, "frequency hop" traffic channels, i.e., randomly switch the frequency band on which a particular traffic channel is transmitted. Frequency hopping reduces the probability of interference events between channels, using interferer diversity and averaging to increase overall communications quality.

Included in the dedicated control channels transmitted in a cell are forward control channels which are used to broadcast control information in a cell of the radiotelephone system to radiotelephones which may seek to access the system. The control information broadcast on a forward control channel may include such things as the cell's identification, an associated network identification, system timing information and other information needed to access the radiotelephone system from a radiotelephone.

Forward control channels, such as the Broadcast Control Channel (BCCH) of the GSM standard, typically are transmitted on a dedicated frequency band in each cell. A radiotelephone seeking access to a system generally "listens" to a control channel in standby mode, and is unsynchronized to a base station or satellite until it captures a base station or satellite control channel. In order to prevent undue interference between control channels in neighboring cells, frequency reuse is conventionally employed, with different dedicated frequency bands being used for the control channel in neighboring cells, according to a frequency reuse pattern that guarantees a minimum separation between cochannel cells. Frequency hopping, which might allow denser reuse of control channel frequency bands, is typically not employed because an unsynchronized radiotelephone generally would have difficulty capturing a frequency-hopped control channel due to lack of a reference point for the frequency hopping sequence employed. Moreover, for private uncoordinated radio communications systems, a frequency reuse pattern cannot be used because each system operates independently of other potentially interfering systems.

In general, in radio communications control communications a downlink (from base to portable) for forward control channels and an uplink (from portable to base) are defined. A radio base station hears the portables' uplink information with its uplink receiver. In order to hear the downlink information sent by other base stations, the base station typically needs a downlink receiver as well. The uplink and the downlink can be distinguished by different frequencies, so-called Frequency Division Duplex (FDD), or by different time slots, so-called Time Division Duplex (TDD). Cellular systems typically use FDD as described above for downlink control channels. In order to measure other base stations, a downlink receiver would be built into the base station which adds costs. With the TDD scheme, the downlink may only be located at another time slot, so the downlink and uplink reception can be performed with the same receiver architecture. DECT, for example, uses the TDD scheme.

There are a number of reasons why, in certain applications, the usage of FDD is favorable above TDD. When the base stations are not time synchronized, a TDD scheme generally results in a mutual interference between uplink and downlink. In addition, because radio base stations are preferably placed at relatively high places in order to get line-of-sight to the portables, interference from base stations (to portables and other base stations) may be dominant. In FDD, uplink and downlink are completely separated in frequency and generally do not interfere with each other.

If in addition, private systems are considered that are based on cellular air-interface standards like GSM or D-AMPS, FDD may be applied for compatibility reasons. Therefore, in private radio communications systems applying FDD for distinguishing uplink and downlink, base stations typically determine which channel to operate on without knowledge of the transmissions from other, nearby radio base stations.

This problem relates particularly to the control or beacon channel of the base stations which transmits periodically in order to attach portables. For traffic channels, the system might be able to use the downlink receiver in the portable to derive knowledge about the interference situation locally. The downlink measurements made in the portable can then be transferred to the radio base station which can then select the optimal (duplex) traffic channel. For the beacon channel, this method generally is not applied, because the presence of a portable cannot be guaranteed when there is no traffic.

In uncoordinated private radio communication systems, mobile terminals and base stations may be unable to even establish communications access if radio beacon interference occurs. Such interference may occur between radio beacon transmissions of uncoordinated private radio communication systems which are located within an interference distance and transmit radio beacons in overlapping times and frequencies. In particular, since radio beacon transmissions are transmitted at fixed time intervals, they can mutually interfere for extended periods of time, effectively preventing mobile terminal access to the uncoordinated systems.

SUMMARY OF THE INVENTION

It is, therefore, an objective of the present invention to resolve the problem of beacon channel interference in private radio communications systems which are mutually uncoordinated and unable to hear each other, but share the same spectrum. To solve the problem of interference between beacon signals from different, uncoordinated and unsynchronized private radio communications base stations, the present invention provides a base station which applies short radio beacon bursts whose locations in time jitter pseudo-randomly. Collisions between radio beacons may happen, but it is very unlikely that all radio beacons are affected when considering a longer time window because radio beacons from different base stations jitter independently. More particularly, it is unlikely that a plurality of consecutive collisions sufficient to lose synchronization will occur. However, because the jittering for a given base station is performed in a pseudo-random manner, a mobile terminal can nonetheless predict when the next radio beacon from an identified base station will arrive, and, therefore, reduces the risk of loss of synchronization with the base station due to the beacon jittering.

In one aspect of a beacon transmission of the present invention, the time period between adjacent radio beacon bursts of the same radio base station jitters pseudo-randomly around an average value. In another embodiment, the number of frames between adjacent radio beacon bursts of the same radio base station is constant; only the time (slot) position within the frame where the radio beacon occurs varies pseudo-randomly.

In one embodiment of the present invention, a private radiotelephone base station is provided including radio transmitting means for transmitting radio beacon bursts for establishing radio communications access with a mobile terminal. The base station includes beacon transmission controlling means for controlling periodic transmission of a radio beacon at jittered time intervals to avoid repeated collision with beacon transmissions from other, uncoordinated private base stations. A jitter generator generates a current beacon jitter value for each beacon transmission which has a magnitude limited to a maximum beacon jitter value and which is generated by a predetermined function having an average output of zero. A beacon transmission initiating means initiates beacon transmission after a determinate time interval which is a function of the current beacon jitter value.

In another aspect of the present invention, a mobile terminal is provided which includes a receiver for receiving radio beacon transmissions from uncoordinated private radiotelephone base stations. The mobile terminal includes beacon reading means for deriving the transmitting base station identification value from a received radio beacon. The mobile terminal further includes determining means for determining the predetermined jitter generating function based on the identification value and synchronizing means for synchronizing the mobile terminal to the time intervals of the jittered radio beacon transmissions based on the predetermined jitter generating function. For example, the base station identification value may be a parameter in the jitter generating function allowing the mobile terminal to predict subsequent jitter values.

Also provided are methods for jittered beacon transmission. A radio beacon is transmitted by the base station which includes an associated identification value and status information. The base station then waits a determinate time before initiating transmission of the next sequential radio beacon. The time is determined by calculating a current beacon jitter value and waiting for a time which is a function of the jitter value and a desired average time between radio beacon transmissions. The initiating transmission and waiting cycle is then repeated for each subsequent radio beacon transmission. A mobile terminal receives the transmitted beacon. The mobile terminal derives the status information from the received radio beacon and determines the availability of the base station for communications with the mobile terminal. The mobile terminal also derives the base station identification value and synchronizes to the base station beacon timing based on a predetermined jitter generating function associated with the identified base station.

Accordingly, the jittered radio beacon transmission of the present invention addresses the problem of beacon collision between uncoordinated private radio communications systems by jittering the time of beacon transmission to reduce the potential for repeated collisions. The present invention also provides a pseudo-random beacon jitter pattern which is associated with a base station identification value which is transmitted to a mobile terminal in the radio beacon. The mobile terminal derives the identification value and is thereafter able to determine the beacon jitter pattern for the identified base station to maintain synchronization even if multiple sequential beacon collisions should occur.

DETAILED DESCRIPTION OF ILLUSTRATED EMBODIMENTS

The present invention now will be described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
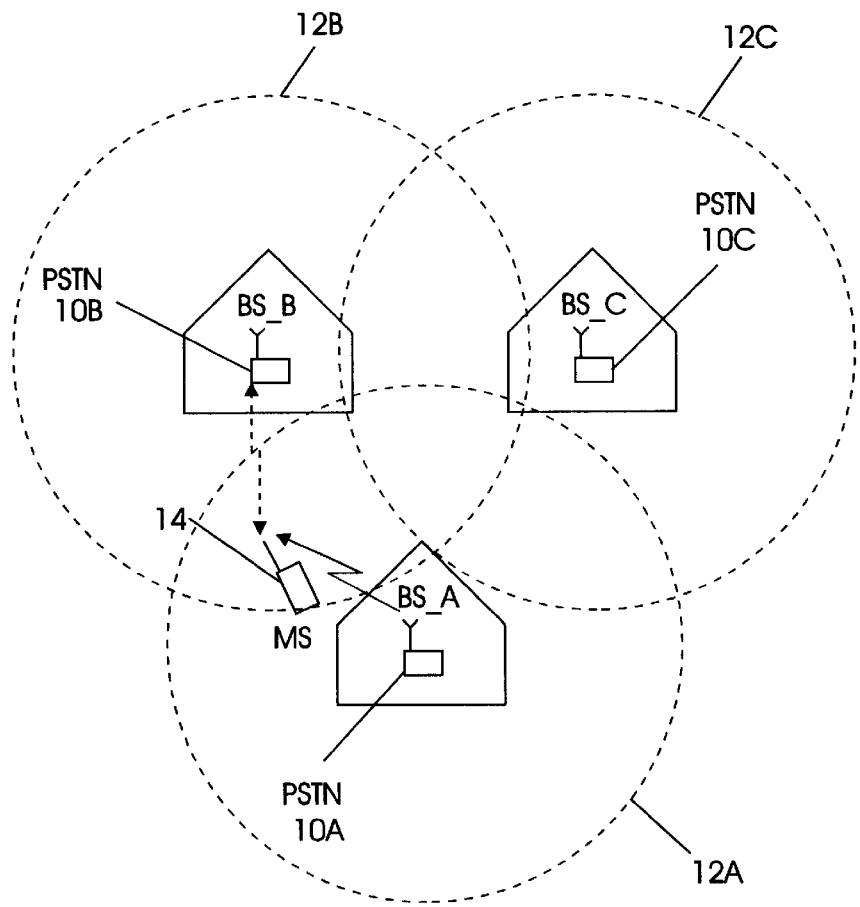
FIG. 1 schematically illustrates three private radio communication systems which are uncoordinated and have overlapping transmission ranges.

Referring now to FIG. 1, an operating environment of the present invention is schematically illustrated. Shown in FIG. 1, are base stations 10A, 10B, 10C which are uncoordinated and unsynchronized radio base stations which may not be able to listen to each other over the air interface because of incompatibility between uplink and downlink channels. As illustrated in FIG. 1, base stations 10A, 10B, 10C are residential private radio personal communications systems located within private homes. An example of such a radio personal communications system is described in the U.S. Pat. No. 5,428,668 which is incorporated herein by reference as if set forth in its entirety. Each of base stations 10A, 10B, 10C are only connected to the PSTN and typically have no direct communications with each other. The transmission range of each base station is illustrated by dotted circles 12A, 12B, 12C and, as illustrated, they overlap. Consequently, interference between base stations 10A, 10B, 10C may occur.

Base stations 10A, 10B, 10C each periodically transmit a short radio beacon burst which may contain status information and an associated identification value for base station 10A, 10B, 10C. Mobile terminal 14, if it is within transmission range 12A, 12B, 12C of base station 10A, 10B, 10C, may receive the radio beacon and determine if it should attach to base station 10A, 10B, 10C.

Figure 2:
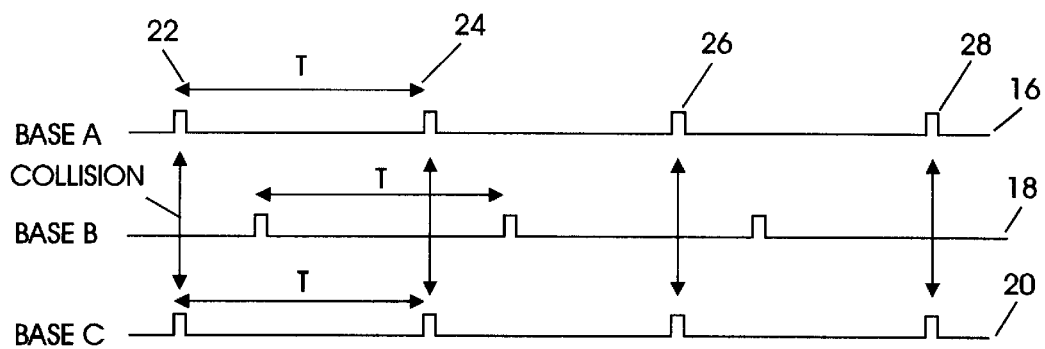
FIG. 2 graphically illustrates radio beacon burst collision between uncoordinated private radio communication systems.

Referring now to FIG. 2, the problem in beacon base communication due to interference caused by collision between beacons of uncoordinated base stations 10A, 10B, 10C will be described. Illustrated are radio beacon transmissions for base station A 10A, base station B 10B, and base station C 10C, respectively, at 16, 18, and 20. Each base station 10A, 10B, 10C transmits a radio beacon burst periodically. Therefore, as illustrated in FIG. 2, over time, each radio beacon signal consists of an infinite series of beacon bursts spaced apart a fixed period "T". As the radio beacon bursts are unsynchronized, they may randomly align and collide as shown for base station A transmissions 16 and base station C transmissions 20 at times 22, 24, 26, 28. Due to the fixed time period T, once a collision occurs at time period 22, consecutive radio beacons 24, 26, 28 also will generally collide. Drift in the system clocks of base station A 10A and base station C 10C may drive the beacons away from collision with each other. However, when the clock drift is small, base station A 10A and base station C 10C can have colliding beacons for a very long time.

Figure 3A:
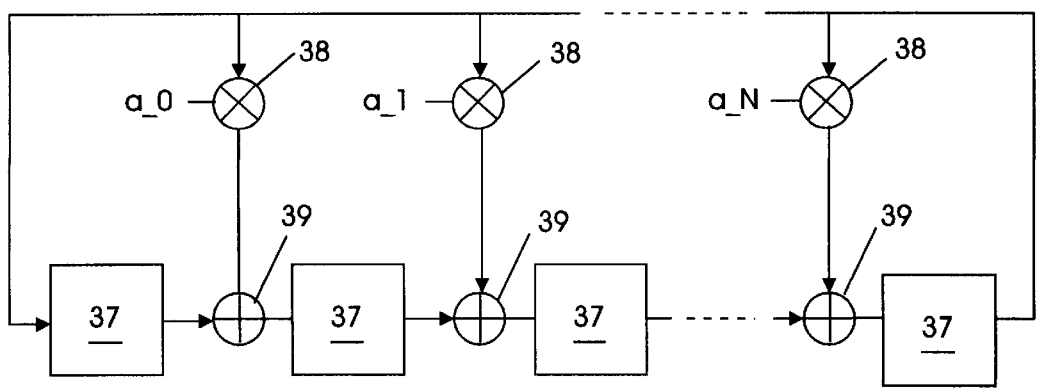
FIG. 3a schematically illustrates a modular shift register generator which may be used to generate a beacon jitter function according to the present invention.
Figure 3:
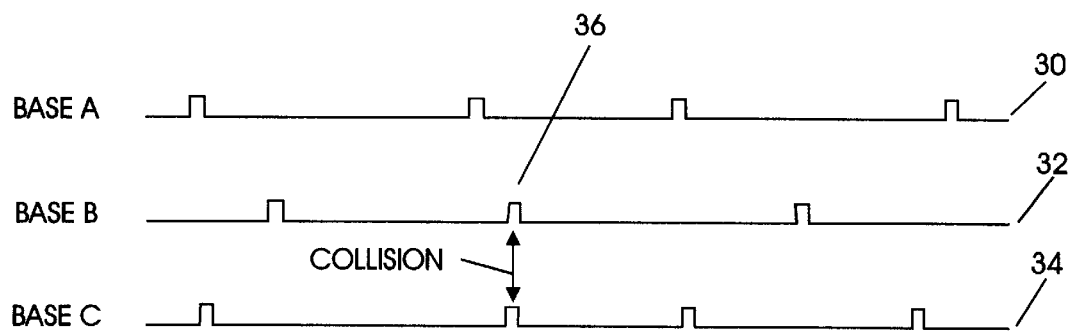
FIG. 3 graphically illustrates jittered transmission of radio beacon bursts to prevent repeated collision of radio beacon bursts.

The intentional beacon radio transmission jitter of the present invention solves this problem as is illustrated graphically in FIG. 3. Illustrated in FIG. 3 are graphical representations of radio beacon burst transmission for base station A 10A, base station B 10B, base station C 10C, respectively, at 30, 32, 34. As illustrated in FIG. 3, the time period between consecutive radio beacon bursts for each radio base station 10A, 10B, 10C jitters within a predetermined window of the average period. Over time, the average period between radio beacons is still a fixed period T, as with the systems in FIG. 2. It is still possible to have a collision between radio beacons even with jittered transmission of the radio beacons as illustrated at time reference 36 where a collision occurs between the radio beacons of base station B 10B and base station C 10C. However, as illustrated further in FIG. 3, due to the jitter in transmission of the radio beacons, the next transmissions of radio beacons from base station B 10B and base station C 10C do not have a collision.

It can be shown mathematically that the probability that M consecutive radio beacon transmissions experience a collision exponentially decays with increasing M. Accordingly, although jittered beacon transmission of the present invention, may not impact the likelihood of a single collision between radio beacon transmissions of uncoordinated radio base stations, the likelihood of consecutive collisions exponentially decreases. Because the likelihood of synchronization loss between mobile terminal 14 and base station 10A, 10B, 10C increases the longer the time period between receipt of radio beacons the present invention provides an improved means of maintaining synchronization between mobile terminal 14 and unsynchronized base stations 10A, 10B, 10C.

It is preferred in practicing the present invention for jittered beacon transmission that the jitter pattern be determined in a pseudo-random way. Pseudo-random, as used herein, refers to a jitter determination providing the appropriate uncoordinated generation of jitter by various base stations 10A, 10B, 10C while at the same time providing jitter in a jitter pattern for any one base station 10A, 10B, 10C which can be predicted over time. For example, in one preferred embodiment, the jitter pattern depends on and can be predicted based upon the associated identification value of the radio base station. This pseudo-random jitter is still random with respect to jitter pattern between different base stations 10A, 10B, 10C, so that base stations 10A, 10B, 10C will not jitter with a common pattern which would result in the problem of repeated collisions. However, having a predictable jitter pattern for any particular base station 10A, 10B, 10C associated with the identification value of the base station, assists mobile terminal 14 in remaining synchronized with jittered radio beacon transmissions from base station 10A, 10B, 10C. Because mobile terminal 14 is provided the associated identification value of the base station in the radio beacon, it is able to determine the jitter pattern for that base station 10A, 10B, 10C.

For example, in one embodiment, the associated identification value of base station 10A, 10B, 10C may define the pseudo-random jitter pattern. Once mobile terminal 14 knows the phase of base station 10A, 10B, 10C in this pattern, mobile terminal 14 may predict the location of all beacons from the identified base station 10A, 10B, 10C in the future. The phase may be passed by base station 10A, 10B, 10C explicitly in the beacon signal, or at first registration when mobile terminal 14 makes contact to the base station. After that, mobile terminal 14 can remain locked to the identified base station 10A, 10B, 10C without losing radio beacon synchronization even if a number of consecutive radio beacon bursts were lost due to collision from various neighboring uncoordinated base stations 10A, 10B, 10C.

More particularly, an example of a pseudo-random technique based on an associated identification value suitable for use with the present invention is as follows. The jittering function of the present invention may be compared to an encryption function in wide area cellular networks operating under protocols such as GSM. An encryption word is generated by a function whose inputs are a secret key and a "counter" number which is incremented at each encryption instant. Typically, the counter number is the frame number of the TDMA channel. The counter number is incremented modulo-N where N is the repetition period of the encryption algorithm. The counter number in fact determines the phase of the algorithm (which accumulates constantly). The secret key specifies the specific algorithm.

For beacon jittering according to the present invention, a similar approach can be used. The input to the jittering (encryption) algorithm may be the base station identification and a counter number which may be the frame number where each beacon signal is sent in a frame. Optionally, a secret key may also be added. The jittering algorithm produces a word of n-bits of which optionally the lower m LSBs may be used to derive $2^m$ different jitter values. The frame number is incremented for each new jitter interval. The base station identification is fixed and determines how the frame number maps to the jitter value at the output. In addition to the base station identification, a secret key may optionally be added which, together with the base station identification, determines the mapping from the frame number to the jitter value. The secret key can, for example, be given to mobile terminal 14 at initialization. This means that only mobile terminal 14 has the secret key corresponding to the received base station identification, allowing it to synchronize to the base station.

To synchronize to the base station, mobile terminal 14 knows the base station identification and the frame number (and possibly the secret key). The base station identification may be sent in the beacon itself. The frame number may also be sent in the beacon (like the frame number in the broadcast control channel of current wide area cellular networks), or it can be provided to mobile terminal 14 when mobile terminal 14 first registers to the transmitting base station. The secret key may be derived from a lookup table which maps the base station identification to a secret key (a lookup table may be generated during initialization). An encryption algorithm which may be used with the present invention preferably provides a jitter value uniformly distributed over its range. One method is to use Pseudo-Random Binary Sequence (PRBS) generators applying linear feedback registers (LFSR) or modular shift register generators (MSRG). An example of a modular shift register circuit is shown in FIG. 3a.

The hardware in the example of FIG. 3a consists of a series of shift registers 37 which are fed back according to a specific function. The multiplicators 38 multiply the feedback signal with coefficients a_i (i=0 to N) and feed the results to the modulo-2 adders (EXORs) 39. The coefficients a_0 to a_N determine the feedback function which is in fact the jitter function. a_i can be 0 or 1 where a 1 establishes a feedback connection and a 0 means no connection. The base station identification (possibly together with the secret key) determines the values of a_i. To determine a new jitter value, the current frame number is loaded into the shift registers. Then the information is clocked once (or a fixed number of times) and after that the jitter value is derived from the (or some of the) outputs of the shift registers. For a next jitter value, the frame number is incremented, loaded into the shift register, and the circuit is clocked again.

The mapping from the base station identification, together with the secret key, can be done in various ways. For example, it is possible to use a table lookup which maps the base station identification to a specific combination of a_i. Many variations are possible to implement the jitter function in a manner suitable to obtain the benefits of the present invention as will be understood by those of skill in the art.

Figure 4:
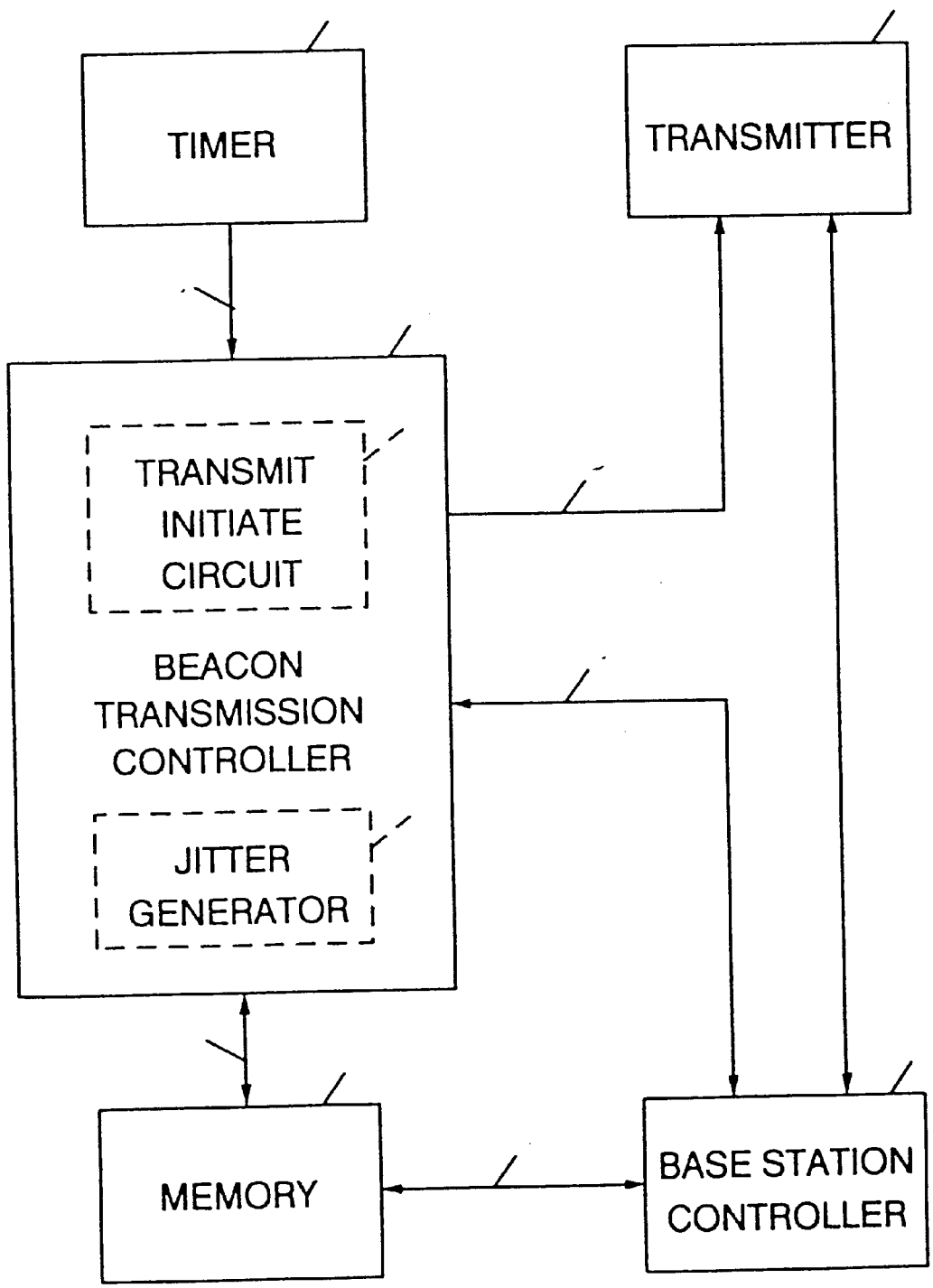
FIG. 4 is a schematic block diagram of a radio personal communications base station according to the present invention.

Referring now to FIG. 4, an embodiment of a base station 10A, 10B, 10C, according to the present invention, will be described. Base station 10A, 10B, 10C includes base station controller 40 or other means for controlling operations of base station 10A, 10B, 10C including radio communications between base station 10A, 10B, 10C and mobile terminal 14. While base station controller 40 serves various functions, for purposes of the present invention, the pertinent functions of base station controller 40 include providing base station identification and status information to beacon transmission controller 42, either directly by electrical connection 44 or through shared memory 46. Base station controller 40 and beacon transmission controller 42 both connect to memory 46 by bus 48, 50. Base station controller 40 further coordinates beacon transmission by beacon transmission controller 42 with other radio communication transmissions initiated by base station controller 40 through transmitter 52.

Memory 46 or other storage means operatively connected to beacon transmission controller 42 and base station controller 40 stores a predetermined jitter function associated with each base station 10A, 10B, 10C. For example, the pre-determined jitter function may be a function having a plurality of assignable coefficients based upon the associated identification value of base station 10A, 10B, 10C. In this case, the function coefficients would be stored in memory 46. Base station status information and the associated identification value may also be stored in memory 46.

Transmitter 52 or other radio transmitting means for transmitting radio communications is operably connected to beacon transmission controller 42 and base station controller 40. While radio transmitting means 52 need only be a transmitter for purposes of radio beacon transmission, it may also be a transceiver providing both transmitting and receiving functions to support uplink and downlink communications between base station 10A, 10B, 10C and mobile terminal 14.

Beacon transmission controller 42 or other beacon transmission controlling means for controlling periodic transmission of a radio beacon by base station 10A, 10B, 10C at jittered time intervals is operably connected to transmitter 52. Beacon transmission controller 42 includes jitter generator 54 or other jitter generating means for generating a current beacon jitter value having a magnitude not greater than a pre-determined maximum beacon jitter value based on the pre-determined function stored in memory 46 and further having an average output of substantially zero. The average jitter output of substantially zero provides the benefit of maintaining an average period between radio beacon transmissions T identical to the fixed period T. Providing a jitter value with a pre-determined maximum value allows for frame timing considerations important in practicing the present invention in TDMA-based radio communications environments as will be discussed further below.

Beacon transmission controller 42 further includes transmit initiate circuit 56 or other beacon transmission initiating means for initiating transmission of a radio beacon at a time which is a function of the current beacon jitter value generated by jitter generator 54. Transmit initiate circuit 56 is, therefore, responsive to jitter generator 54 and operably electrically connected to transmitter 52 by electrical connection 58. Beacon transmission controller 42 prepares the radio beacon, including base station 10A, 10B, 10C associated identification value and status information from base station controller 40, which is transmitted by transmitter 52 responsive to transmit initiate circuit 56 triggering transmission of the radio beacon burst at a pseudo-random jittered time interval.

Also illustrated in FIG. 4 is timer 60 or other timing means for providing beacon transmission controller 42 a clock time reference for timing transmission of radio beacons. Timer 60 is electrically connected to beacon transmission controller 42 by electrical connection 62.

Figure 5:
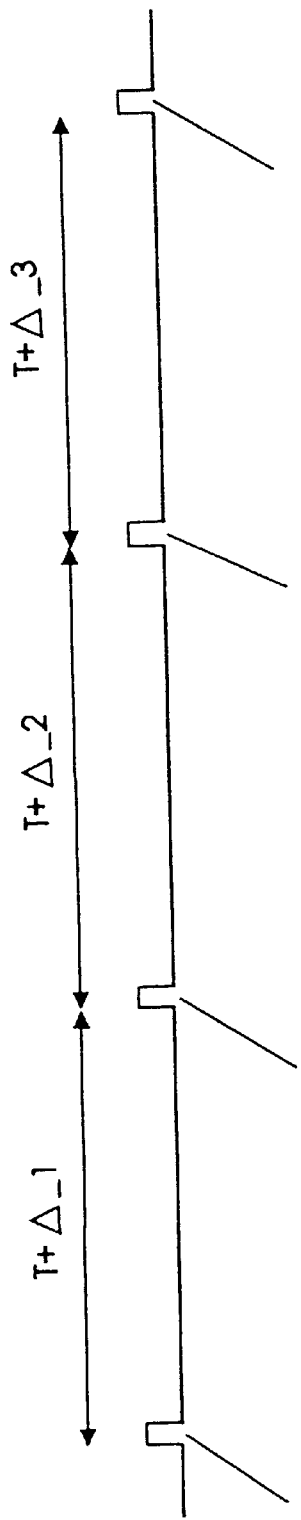
FIG. 5 graphically illustrates one embodiment of beacon jittering according to the present invention.

While various functions may be applied by beacon transmission controller 42, for repeatedly transmitting a radio beacon at jittered time intervals, two particular embodiments will be described with reference to FIGS. 5 and 6, respectively. FIG. 5 illustrates a transmit initiate embodiment based on the desired average time interval between radio beacons T and the jitter value from jitter generator 54. In particular, the determinant time between transmission of subsequent consecutive radio beacons is referenced to the transmit time of the most recently transmitted radio beacon.

As illustrated in FIG. 5, a first radio beacon 64 is followed by a second radio beacon 66 which is initiated at time $T+\Delta_1$ where T is the desired average time between radio beacon transmissions and $\Delta_1$ is the current beacon jitter value from jitter generator 54. Third beacon 68 is transmitted at time $T+\Delta_2$ after initiating transmission of second beacon 66. Likewise, fourth beacon 70 is transmitted at time $T+\Delta_3$ after initiating transmission of third beacon 68. $\Delta_2$ and $\Delta_3$ are respectively current beacon jitter values for each subsequent cycles from jitter generator 54. By defining the jitter generator function as a pseudo-random function which is determinant based on the associated identification value of the respective identified base station 10A, 10B, 10C, once mobile terminal 14 has received any one radio beacon 64, 66, 68, 70, mobile terminal 14 is able to predict all subsequent $\Delta_i$ and synchronize to beacon transmissions from the identified base station 10A, 10B, 10C.

In other words, in the embodiment of FIG. 5, the reference for jittering is based on the location of the previous radio beacon burst transmission. For example, assuming that the first radio beacon burst is transmitted at $T_1$, then the second burst is transmitted at $T_2=T_1+T+\Delta_2$. Likewise, the third burst is based on the location of the second burst and will arrive at $T_3=T_1+T+\Delta_2+T+\Delta_3=T_1+2T+\Delta_2+\Delta_3$ where $\Delta_2$ is the jittering for the second beacon instant and $\Delta_3$ is the jittering for the third beacon instant. As described previously, the average jittering $\Delta_i$ is zero.

Figure 6:
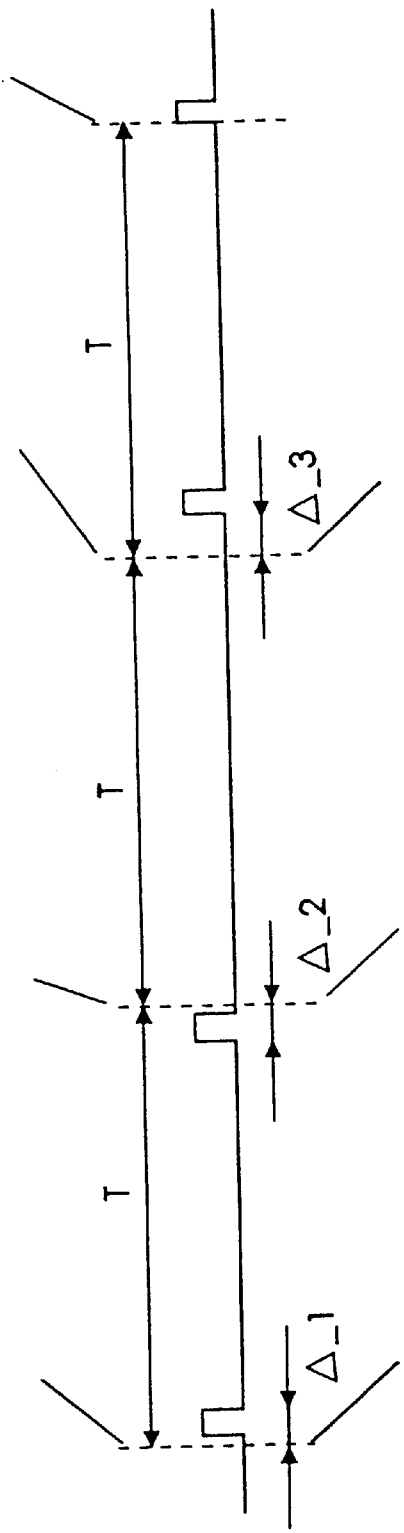
FIG. 6 graphically illustrates another embodiment of beacon jittering according to the present invention.

Referring now to FIG. 6, an alternative embodiment for determining a determinant time at which transmit initiate circuit 56 initiates transmission of a radio beacon is illustrated. In the embodiment of FIG. 6, the jittering of radio beacon transmission timing is based on a constant time reference rather than shifting based on the transmission time of the previous beacon burst. As illustrated in FIG. 6, beacon transmission is jittered with respect to a pre-determined time reference 72, 72', 72", 72'". In the embodiment of FIG. 6, for each radio beacon burst transmission the initiation of beacon transmission is based on time reference 72, 72', 72", 72'". The actual transmission is initiated by transmit initiate circuit 56 based on offsetting the fixed initiate time 72, 72', 72", 72'" by the current beacon jitter value from jitter generator 54. For example, assume that the first radio beacon burst is initiated at time $T_1=0+\Delta_1$ as illustrated in FIG. 6 at 74. The time zero reference refers only to time reference 72 and is mentioned solely for clarification. As illustrated at 76, the second radio beacon burst is initiated at time $T_2=T+\Delta_2$. Subsequently, as illustrated at 78, the third beacon burst arrives at time $T_3=2T+\Delta_3$.

With respect to the embodiment of FIG. 5, the determinant time between initiating transmission of radio beacon bursts equals the average period T between base station beacon transmissions plus the calculated current beacon jitter value from jitter generator 54. In contrast, in the embodiment of FIG. 6, with jitter about a pre-determined reference 72, 72', 72", 72'", the determinant time between initiating transmission of radio beacon bursts equals the average period between base station beacon transmissions plus the calculated current beacon jitter value minus the calculated beacon jitter value for the most recent previously transmitted radio beacon burst. Accordingly, in the embodiment of FIG. 6, beacon transmission jittering with respect to pre-determined reference 72, 72', 72", 72'" may be accomplished by timing initiation of transmissions with respect to the preceding radio beacon transmission by maintaining both the current beacon jitter value and the most recent beacon jitter value for the last transmitted radio beacon burst. It can be demonstrated mathematically that monitoring base station 10A, 10B, 10C over a relatively short time period, the excursions from the average time T in the embodiment of FIG. 5 may be much larger than those in the embodiment of FIG. 6 for a given maximum beacon jitter value.

For a private radio telephone base station 10A, 10B, 10C located in a personal residence, either the embodiment of FIG. 5 or FIG. 6 may be used. The embodiment of FIG. 5 is more random in character and, therefore, the probability of consecutive collisions will be smaller than the embodiment of FIG. 6. On the other hand, in the embodiment of FIG. 6, the probability of loss of beacon synchronization by mobile terminal 14 is smaller when a large number of consecutive beacon collisions do occur. For multiple user private radio telephone base stations 10A, 10B, 10C where a plurality of base stations form an associated private local network, the embodiment of FIG. 6 may be preferred. This is particularly true where the private network utilizes TDMA communications standards which only allow mobile terminal 14 to listen for radio beacon bursts during idle frames.

Figure 7:
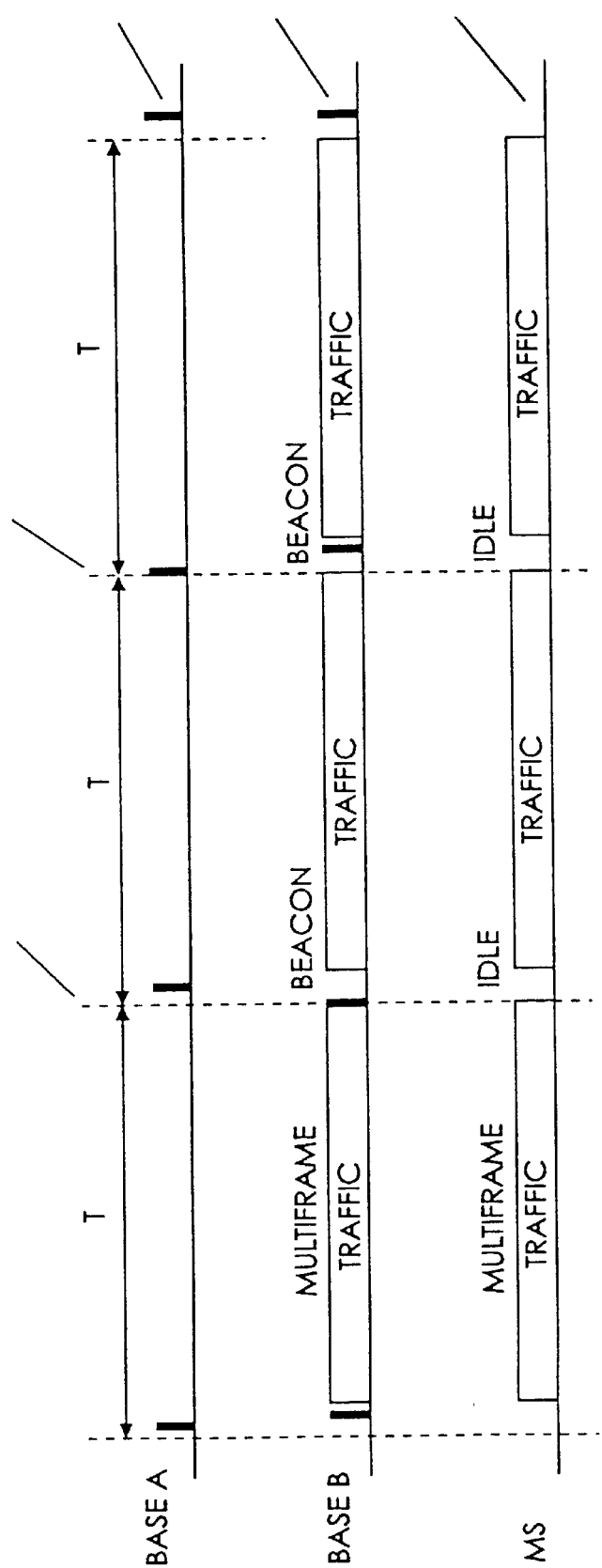
FIG. 7 graphically illustrates beacon jittering according to the present invention in a multi-frame TDMA radio communications environment.

For example, in a private radio communications network using a GSM-compatible air interface, mobile terminal 14 can only look for base station beacon transmissions during idle frames 80, 80' (FIG. 7) which occur every 26 TDMA frames. The radio beacon burst signals must arrive in idle frame 80, 80' to be monitored by mobile terminal 14. As illustrated in FIG. 7, mobile terminal 14 (graph 82) has a call underway on a radio communication connection with base station 10B (graph 84). In idle frames 80, 80', base stations 10A, 10B can transmit radio beacons and mobile terminal 14 can listen for beacon transmissions. Radio transmission beacon period T, as shown in FIG. 7, is a multiple of the 26 frame multiframe; the jittering must occur over a frame or 8 slots. Jittering prevents radio beacon transmission collision between base stations 10A and 10B (comparing graphs 84 and 86).

As will be appreciated by those of skill in the art, the above described aspects of the present invention in FIG. 4 may be provided by hardware, software, or a combination of the above. While the various components of base station 10A, 10B, 10C have been illustrated in FIG. 4 as discrete elements, they may in practice be implemented by a microcontroller including input and output ports and running software code, by custom or hybrid chips, by discrete components or by a combination of the above. For example, beacon transmission controller 42, memory 46 and base station controller 40 could all be implemented as a single programmable device.

Figure 8:
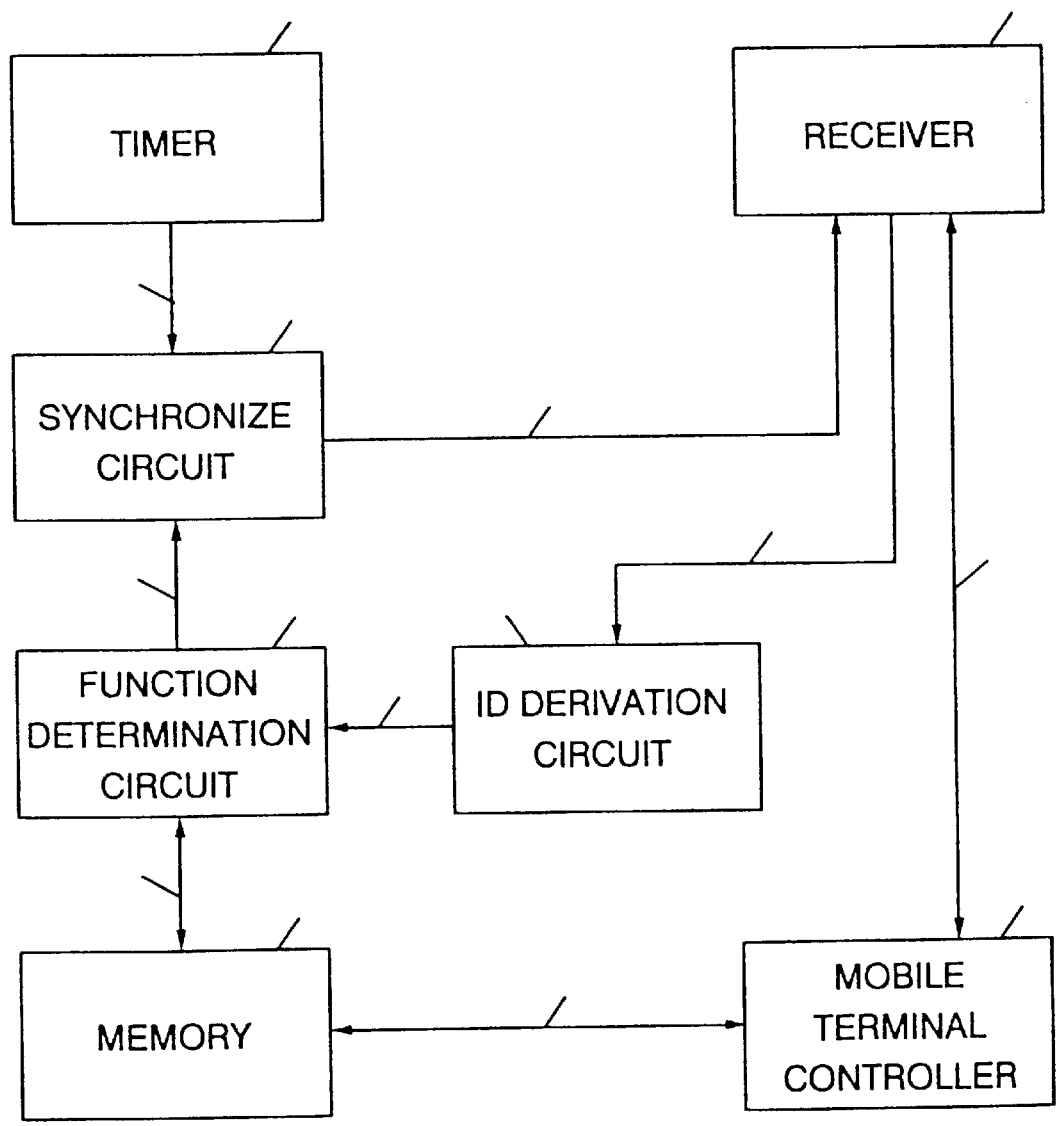
FIG. 8 is a schematic block diagram of a mobile terminal according to the present invention.

Referring now to FIG. 8, a mobile terminal 14 according to the present invention will be described. Mobile terminal 14 includes mobile terminal controller 88 or other means for controlling operations of mobile terminal 14 including controlling radio communications between mobile terminal 14 and base station 10A, 10B, 10C. Mobile terminal 14 also includes receiver 90 or other mobile radio receiving means for receiving radio communications including radio beacons from base station 10A, 10B, 10C electrically connected to mobile terminal controller 88 by line 89. Receiver 90 need only be a receiver for purposes of radio beacon reception, however, it may also be a transceiver providing both transmitting and receiving functions to support uplink and downlink communications between mobile terminal 14 and base stations 10A, 10B, 10C.

Mobile terminal 14 includes. ID derivation circuit 92 or other beacon reading means for deriving the transmitted base station identification value from received radio beacons. ID derivation circuit 92 is operably electrically connected by line 91 to receiver 90. Mobile terminal 14 also includes function determination circuit 94 or other determining means for determining the pre-determined function used by the identified base station 10A, 10B, 10C for jitter of radio beacon transmissions based on the base station identification value derived by ID derivation circuit 92. Function determination circuit 94 is electrically operably connected to ID derivation circuit 92 as indicated at line 96. Function determination circuit 94 is also operably electrically connected by line 97 to synchronize circuit 98 or other means for synchronizing mobile terminal 14 beacon transmission reception to the time intervals for jittered radio beacon transmission from the identified base station 10A, 10B, 10C based on the pre-determined jitter function. Synchronize circuit 98 is also operably connected to receiver 90 as illustrated by line 101 and may further be operably connected to mobile terminal controller 88.

Also illustrated in FIG. 8 is timer 100 or other timing means for providing mobile terminal 14 a clock time reference for timing receipt or transmission of radio beacons. Timer 100 is electrically operably connected to synchronize circuit 98 by electrical connection 102.

Memory 104 is operably connected both to ID derivation circuit 92 and mobile terminal controller 88 by electrical connections 106 and 108, respectively. Memory 104 may provide means such as a lookup table with cross-referenced information between identification value of the transmitting base station and the pre-determined jitter function.

As will be appreciated by those of skill in the art, the above described aspects of the present invention in FIG. 8 may be provided by hardware, software, or a combination of the above. While the various components of mobile terminal 14 have been illustrated in FIG. 8 as discrete elements, they may in practice be implemented by a microcontroller including input and output ports and running software code, by custom or hybrid chips, by discrete components, or by a combination of the above. For example, mobile terminal controller 88, memory 104, ID derivation circuit 92, function determination circuit 94, and synchronize circuit 98 could all be implemented as a single programmable device.

Figure 9:
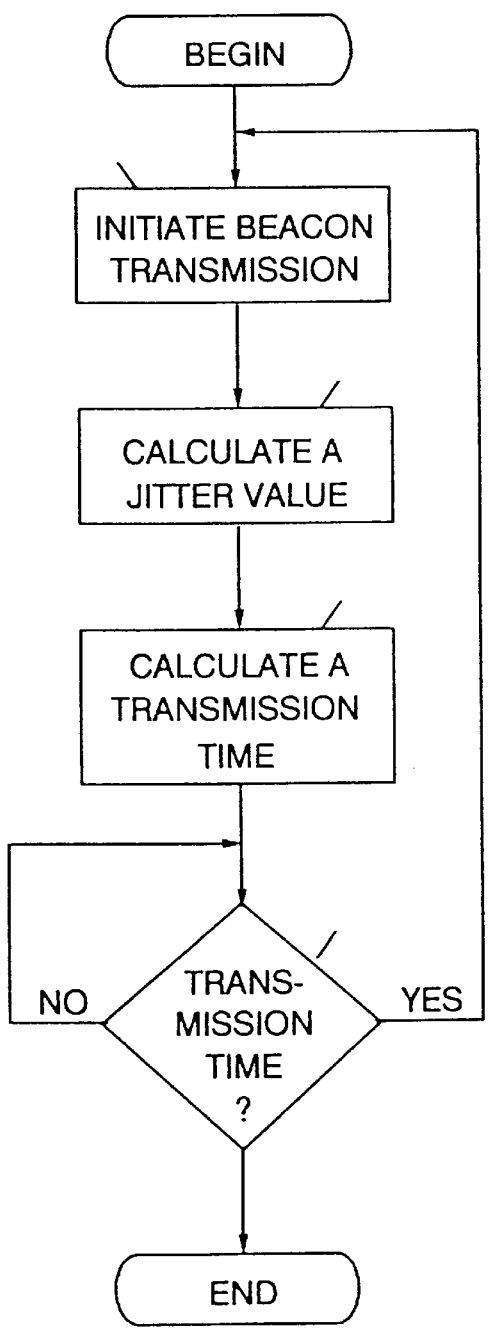
FIG. 9 is a flowchart illustrating operations of a private radio communications base station according to the present invention.

FIG. 9 illustrates a method of operation for beacon channel transmission timing by private radio telephone base station 10A, 10B, 10C comprising repeatedly transmitting a radio beacon at jittered time intervals. Radio beacon transmission timing operations begin at block 110 with base station 10A, 10B, 10C initiating beacon transmission. The transmitted radio beacon contains an associated identification value for the transmitting base station 10A, 10B, 10C and may further contain base station status information. At block 112, base station 10A, 10B, 10C calculates a current beacon jitter value. The jitter value is limited to a maximum beacon jitter value magnitude as described previously and is generated by a pre-determined function which is associated with the base station identification value and which has an average output value of zero.

At block 114, base station 10A, 10B, 10C calculates a determinant time between initiating transmission of subsequent radio beacons based on a function of the current beacon jitter value and the average period T between radio beacon transmissions for the private radio communication system. At block 116, base station 10A, 10B, 10C waits the calculated determinant time before returning to block 110 to initiate transmission of another radio beacon and to repeat the steps at blocks 112, 114, and 116 for calculating and waiting the jittered time interval until the next transmission.

Figure 10:
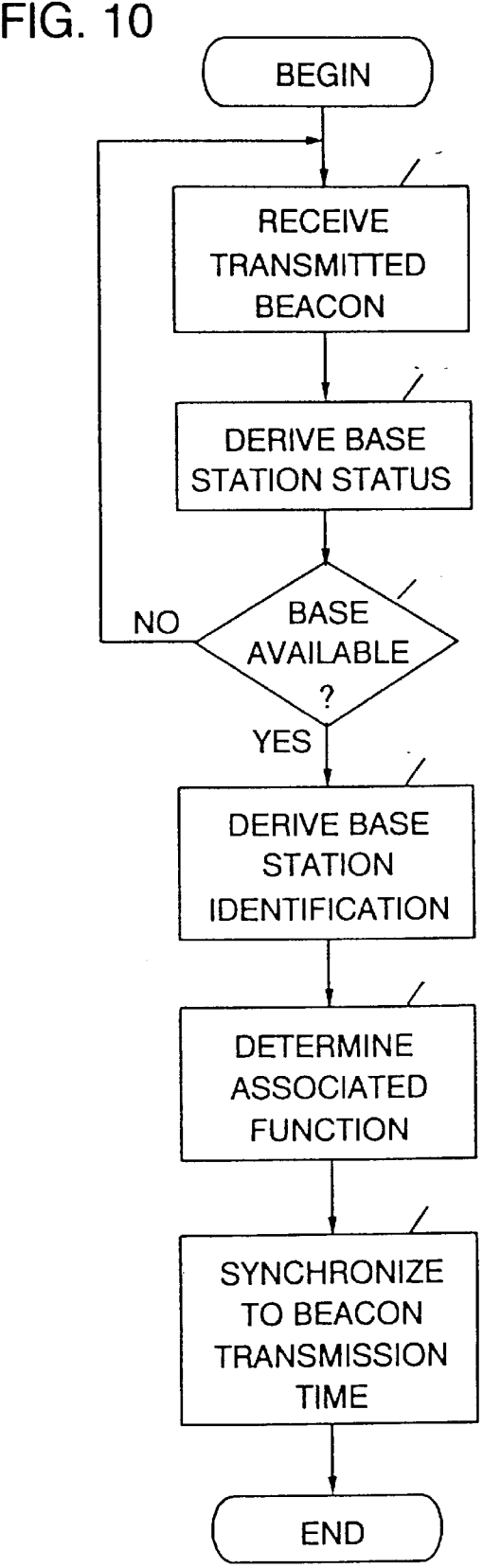
FIG. 10 is a flowchart illustrating operations of a mobile terminal according to the present invention.

FIG. 10 illustrates operations of mobile terminal 14 in an embodiment of the methods of the present invention. At block 120, mobile terminal 14 receives a transmitted radio beacon from base station 10A, 10B, 10C. At block 122, mobile terminal 14 derives the base station 10A, 10B, 10C status information from the received radio beacon. Mobile terminal 14 then determines the availability of the identified base station for communications with mobile terminal 14 based on the received base station status information at block 124. A base station may be unavailable, for example, if mobile terminal 14 is not an authorized user for that base station. If the status information indicates that the associated base station 10A, 10B, 10C is not available for communications with mobile terminal 14, mobile terminal 14 returns to block 120 and continues to receive transmitted radio beacons from base stations 10A, 10B, 10C.

If the received status information indicates that the transmitting base station 10A, 10B, 10C is available for communications with mobile terminal 14, at block 126, mobile terminal 14 derives the base station identification value from the received radio beacon. The associated pre-determined jitter function for the identified base station is determined at block 128. At block 130 mobile terminal 14 synchronizes to the identified base station 10A, 10B, 10C beacon timing based on the pre-determined jitter function associated with the identified base station from operations at block 128. Mobile terminal 14 thereafter anticipates the timing of the jittered radio beacon transmissions from the identified base station 10A, 10B, 10C and maintains synchronization until it moves outside the transmission range 12A, 12B, 12C of the identified base station 10A, 10B, 10C.

As illustrated in FIG. 10 the status is derived followed by the base station identification. It is to be understood that the benefits of the present invention may also be obtained by deriving the identification first. Mobile terminal 14 may then determine based on the identification if it is a permitted base station and if so derive the status information. If the base station identification is not in the list of base stations mobile terminal 14 is allowed to use the status need not be derived.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for beacon channel transmission timing by a private radiotelephone base station which has an associated identification value, comprising the step of:

repeatedly transmitting a radio beacon at jittered time intervals which are calculated based on a predetermined function associated with the base station identification value; and wherein the private radiotelephone base station has a transmission range and wherein the transmitted radio beacons contain the associated identification value and wherein a mobile terminal within the transmission range of the base station performs the following steps:

receiving one of the transmitted radio beacons;

deriving the base station identification value from the received radio beacon; and synchronizing to the base station beacon timing based on the predetermined function associated with the identified base station; and wherein the predetermined function is an encryption function using the base station identification value and a counter number.

2. The method of claim 1 wherein the radio beacon is transmitted in a selected frame number and wherein the counter number is the selected frame number.

3. A method for beacon channel transmission timing by a private radiotelephone base station, comprising the steps of:

initiating transmission of a radio beacon;

waiting a determinate time after said initiating transmission step, the determinate time being a function of a beacon jitter value; and, then repeating said initiating and waiting steps; and wherein said waiting step includes the step of:

calculating a current beacon jitter value having a magnitude not greater than a maximum beacon jitter value using a predetermined function having an average output value of substantially zero; and, wherein said determinate time of said waiting step equals the average period between private radiotelephone base station beacon transmissions plus the calculated current beacon jitter value.

4. The method of claim 3 wherein the base station has an associated identification value and wherein said predetermined function is associated with the base station.

5. The method of claim 4 wherein the radio beacon contains the associated identification value and wherein a mobile terminal within the transmission range of the base station performs the following steps:

receiving a transmitted radio beacon;

deriving the base station identification value from the received radio beacon; and synchronizing to the base station beacon timing based on the predetermined function associated with the identified base station.

6. The method of claim 5 wherein the radio beacon contains base station status information and wherein said deriving step includes the step of deriving the base station status information from the received radio beacon and wherein said deriving step is followed by the mobile terminal performing the step of determining the availability of the base station for communications with the mobile terminal based on the received base station status information.

7. A method for beacon channel transmission timing by a private radiotelephone base station, comprising the steps of:

initiating transmission of a radio beacon;

waiting a determinate time after said initiating transmission step, the determinate time being a function of a beacon jitter value; and, then repeating said initiating and waiting steps; and wherein said waiting step includes the step of:

calculating a current beacon jitter value having a magnitude not greater than a maximum beacon jitter value using a predetermined function having an average output value of substantially zero; and, wherein said determinate time of said waiting step equals the average period between private radiotelephone base station beacon transmissions plus the calculated current beacon jitter value minus the beacon jitter value of the most recent previously transmitted radio beacon.

8. The method of claim 7 wherein the base station has an associated identification value and wherein said predetermined function is associated with the base station.

9. The method of claim 8 wherein the radio beacon contains the associated identification value and wherein a mobile terminal within the transmission range of the base station performs the following steps:

receiving a transmitted radio beacon;

deriving the base station identification value from the received radio beacon; and synchronizing to the base station beacon timing based on the predetermined function associated with the identified base station.

10. The method of claim 9 wherein the radio beacon contains base station status information and wherein said deriving step includes the step of deriving the base station status information from the received radio beacon and wherein said deriving step is followed by the mobile terminal performing the step of determining the availability of the base station for communications with the mobile terminal based on the received base station status information.

11. A private radiotelephone base station, comprising:

radio transmitting means for transmitting radio communications; and, beacon transmission controlling means operably connected to said radio transmitting means for controlling periodic transmission of a radio beacon by said base station at jittered time intervals, said beacon transmission controlling means including:

jitter generating means for generating a current beacon jitter value having a magnitude not greater than a predetermined maximum beacon jitter value based on a predetermined function having an average output of substantially zero; and, beacon transmission initiating means operably connected to said base radio transmitting means and responsive to said jitter generating means for initiating transmission of said radio beacon at a time which is a function of said current beacon jitter value.

12. The private radiotelephone base station of claim 11, further comprising storage means operatively connected to said beacon transmission controlling means for storing said predetermined function.

13. The private radiotelephone base station of claim 12 wherein said base station has an associated identification value and wherein said storage means includes means for storing said associated identification value and wherein said radio beacon contains said associated identification value.

14. A synchronized private radio communications system having a jittered interval between radio beacon transmissions from a private base station to a mobile terminal, said base station comprising:

base radio transmitting means for transmitting radio communications; and, beacon transmission controlling means operably connected to said base radio transmitting means for controlling periodic transmission of a radio beacon by said base station at jittered time intervals, said beacon transmission controlling means including:

jitter generating means for generating a current beacon jitter value having a magnitude not greater than a predetermined maximum beacon jitter value based on a predetermined function having an average output of substantially zero; and, beacon transmission initiating means operably connected to said radio transmitting means and responsive to said jitter generating means for initiating transmission of said radio beacon at a time which is a function of said current beacon jitter value; and, wherein said mobile terminal comprises:

mobile radio receiving means for receiving said radio beacon;

beacon reading means operably connected to said mobile radio receiving means for deriving said base station identification value from said received radio beacon;

determining means operatively connected to said beacon reading means for determining said predetermined function based on said base station identification value; and synchronizing means operatively connected to said determining means for synchronizing said mobile terminal to said time intervals of said radio beacon transmission based on said predetermined function.

* * * * *